United States Patent [19]

Andres et al.

[11] 4,178,016
[45] Dec. 11, 1979

[54] TRIGGERING INSTALLATION FOR A PASSENGER PROTECTION DEVICE IN A VEHICLE

[75] Inventors: Rudolf Andres, Sindelfingen; Heinz W. Knoll, Aidlingen, both of Fed. Rep. of Germany

[73] Assignee: Daimler-Benz Aktiengesellschaft, Fed. Rep. of Germany

[21] Appl. No.: 811,723

[22] Filed: Jun. 30, 1977

[30] Foreign Application Priority Data

Jul. 10, 1976 [DE] Fed. Rep. of Germany ....... 2631190

[51] Int. Cl.² ............................................. B60R 21/08
[52] U.S. Cl. .................................. 280/734; 102/27 R; 180/103 A; 340/52 H
[58] Field of Search .............................. 280/734, 735; 180/103 A, 82 C; 102/27 R

[56] References Cited

U.S. PATENT DOCUMENTS

| | | | |
|---|---|---|---|
| 3,407,731 | 10/1968 | Evans | 102/27 R |
| 3,622,974 | 11/1971 | Best | 280/735 X |
| 3,663,035 | 5/1972 | Norton | 280/734 |
| 3,668,627 | 6/1972 | Brainerd | 180/103 A X |
| 3,706,277 | 12/1972 | Willard | 102/27 R |
| 3,742,858 | 7/1973 | Stonestrom | 280/735 X |
| 3,745,523 | 7/1973 | Lewis | 280/735 X |

*Primary Examiner*—John P. Silverstrim
*Attorney, Agent, or Firm*—Craig and Antonelli

[57] ABSTRACT

A triggering system for a passenger protective installation in a motor vehicle with a sensor-controlled device which, in the presence of predetermined criteria, supplies a pulse for triggering a primer operating preferably on pyrotechnical basis; the primer is thereby accommodated shielded, preferably inside a housing surrounding the sensor-controlled device, while at least one fuse cord, adapted to burn at high velocity, leads from the primer to an energy source, such as a pyrotechnical charge, instantaneously transferring the passenger protective installation into its effective operating position.

18 Claims, 4 Drawing Figures

TRIGGERING INSTALLATION FOR A PASSENGER PROTECTION DEVICE IN A VEHICLE

The present invention relates to a triggering device for a passenger protective installation in a vehicle, especially in motor vehicles, with a sensor-controlled installation which, in the presence of predetermined criteria, supplies a pulse for triggering a primer or igniter preferably operating on a pyrotechnical basis.

This primer or igniter activates an energy source which, for example, can be constructed as pyrotechnical charge and instantaneously transfers the passenger protective installation, such as an air bag or a safety belt system with a belt tightener, into the effective operating position thereof. The heretofore known pyrotechnical charges, igniters or primers and energy sources thereby form a structural unit and the ignition pulse is supplied electrically to the primer constructed as a rule as primer capsule or fuse pellet. Electrical feed lines which for the most part are of different length result therefrom which by reason of possible interference insolations or heat radiations that effect an undesired triggering of the passenger protective installation have to be shielded at great expenditure.

It is the aim of the present invention to undertake the transmission of a desired triggering pulse to the energy source in the simplest way and under the most far-reaching preservation of the short signal travel time and simultaneously to assure that also in case of failure of the line shielding and in case of interference isolation or radiation no faulty or unintentional triggering can take place.

This is achieved according to the present invention in that the primer or ignition device is accommodated shielded, possible inside of a housing surrounding the sensor controlled installation, and in that at least one conventional fuse cord adapted to burn at high velocity extends from the primer or igniter to an energy source, for example, to a pyrotechnical charge instantaneously transferring the passenger protection installation into its effective operating position. These fuse cords which are commercially sold under the designation "NONEL", can be laid out without special protective measures, are resistant against aging and are far-reachingly insensitive against vibrations and shocks.

In a preferred embodiment of the present invention, the energy required for the activation of the primer or igniter is stored in at least one element and is recalled by the pulse produced by the sensor-controlled installation. It is assured thereby that also after the collapse or breakdown of the electrical power supply of the vehicle, which may occur in case of a front end impact already after about 10 ms, a safe and reliable triggering takes place.

According to a further feature of the present invention, two elements may be series connected and may be constructed as a primary cell, as a high-value capacitor or as an accumulator battery. The rating and/or size of each of the two elements being such that, in case of a failure of one element, the voltage and/or capacity of the remaining element still suffices with certainty to trigger the igniter or primer.

With the use of primary elements or cells, the same could be exchanged during regularly scheduled servicings of the vehicle.

A particularly simple installation and assembly results if the fuse cord is completed into a type of line network by preferably interconnectable branch and coupling members adapted to be plugged into one another, whose free ends lead respectively to a pyrotechnical charge.

In a further preferred embodiment of the present invention, the operating readiness of the transmission path form the primer or igniter to each pyrotechnical charge can be tested by means of a continuous check of an electrical line taken along with the fuse cord, for example, in conjunction with an optical indication.

Accordingly, it is an object of the present invention to provide a triggering system for a passenger protection installation in a vehicle which avoids by simple means the aforementioned shortcomings and drawbacks encountered in the prior art.

Another object of the present invention resides in a triggering installation for a passenger protective system in a motor vehicle which obviates the needs for large expenditures to protect the system against undesired triggering as a result of interference insolations or radiations.

A further object of the present invention resides in a triggering installation for a passenger protection installation which assures the transmission of a desired triggering pulse to the energy source from the igniter in the simplest manner while simultaneously assuring the absence of a faulty triggering even in case of failure of the line shielding.

Still another object of the present invention resides in a triggering system of the type described above which assures a safe and reliable triggering even in case of collapse of the electric power system of the motor vehicle, for example, as may occur in case of a front end collision.

Another object of the present invention resides in a triggering system for a passenger protection installation in motor vehicles which permits a simple installation, uncomplicated layout of the lines and great reliability of its operation.

These and further objects, features and advantages of the present invention will become more apparent from the following description when taken in connection with the accompanying drawing, which shows, for purposes of illustration only, one embodiment in accordance with the present invention, and wherein.

Figure 1:
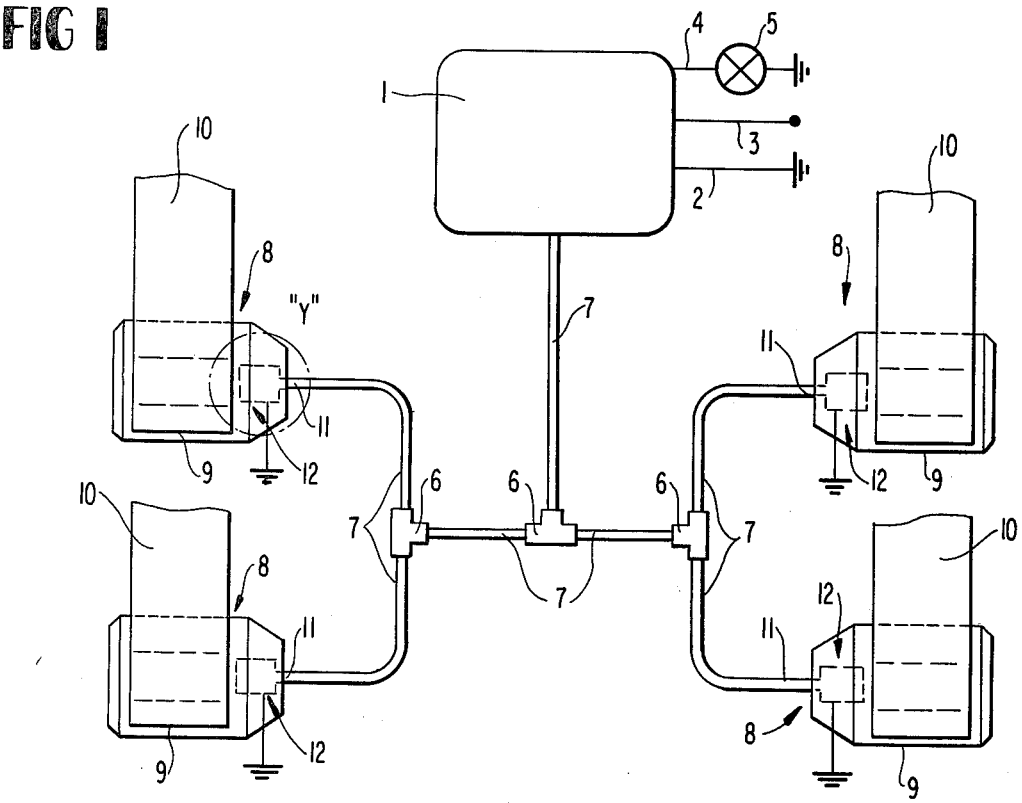
FIG. 1 is a schematic view of the overall arrangement of an installation according to the present invention with four indicated belt tighteners.

Referring now to the drawing wherein like reference numerals are used throughout the various views to designate like parts, a line 4 extends from a sensor-controlled installation 1 which is connected by way of a line 2 with ground and by way of a line 3 with the power supply voltage, to an optical indicating device 5, while a fuse cord 7 adapted to burn with high velocity and completed into a type of line network by branching and coupling pieces 6, leads from the sensor-controlled installation 1 to the passenger protection mechanisms generally designated by reference numeral 8 which in the illustrated embodiment are constructed as belt tighteners 9 with a safety belt system 10, not illustrated in detail, connected thereto. The free ends 11 of the fuse cord 7 lead, as indicated, in each case to an energy source generally designated by reference numeral 12 which, when activated, instantaneously transfers the coordinated passenger protection mechanism 8 into its effective position.

Figure 2:
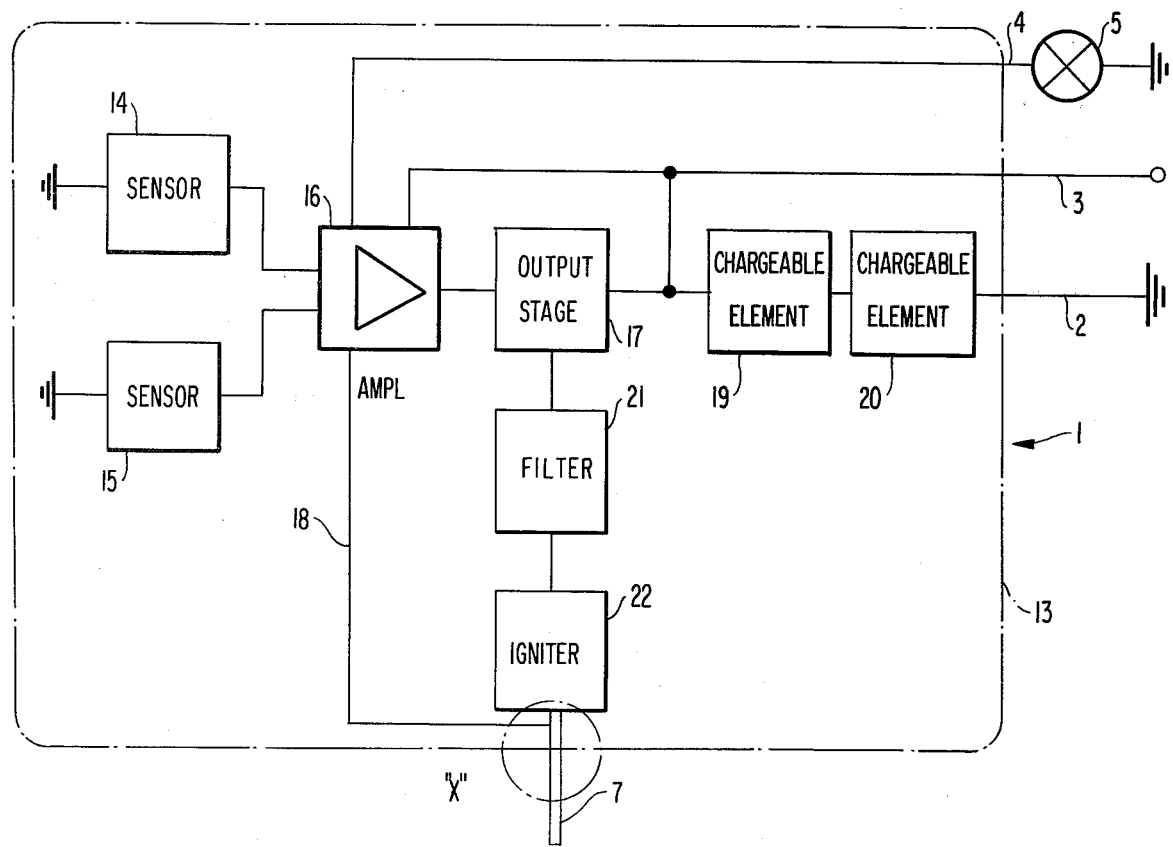
FIG. 2 is a schematic block diagram of a possible construction of a sensor-controlled installation in accordance with the present invention.

The sensor-controlled installation according to FIG. 2 is secured against interference insolations and radiations by a housing 13 and other conventional measures (not shown). Two sensors 14 and 15, which with a corresponding construction may also be arranged outside of the housing 13, supply a signal in case of an accident, when predetermined limit values are attained. The sensor 14 thereby responds in case of an impact and the sensor 15 responds in case of a rolling over. The thus-produced signal is fed to the input of an amplifier 16, whereby an output stage 17 is connected to the output of the amplifier 16. In addition to the already described lines 3 and 4, an electrical line 18, which forms part of a control installation to be explained more fully hereinafter, leads to the amplifier 16. Two series-connected chargeable elements 19 and 20 are connected to the output stage 17. Each of the chargeable elements 19, 20 are of any conventional construction and each has a rating and/or size so as to assure that, in case of a collapsed vehicle power supply, the signal passing the output stage 17 and a filter 21 connected in the output thereof, still starts the connected igniter or primer 22 with sufficient certainty and adequate safety.

Figure 3:
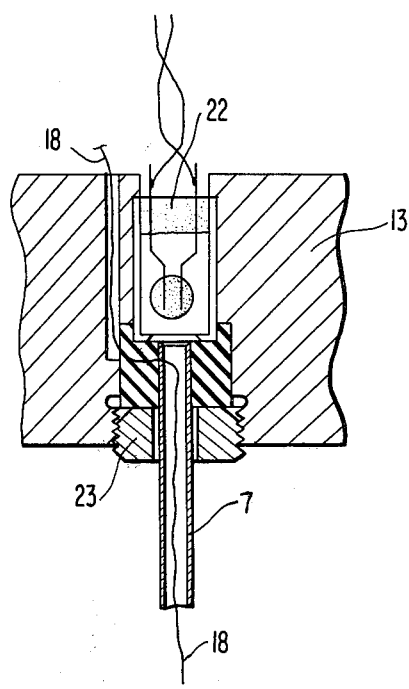
FIG. 3 is a somewhat schematic cross-sectional view illustrating the details of the parts within the dash and dot circle "X" of FIG. 2.
Figure 4:
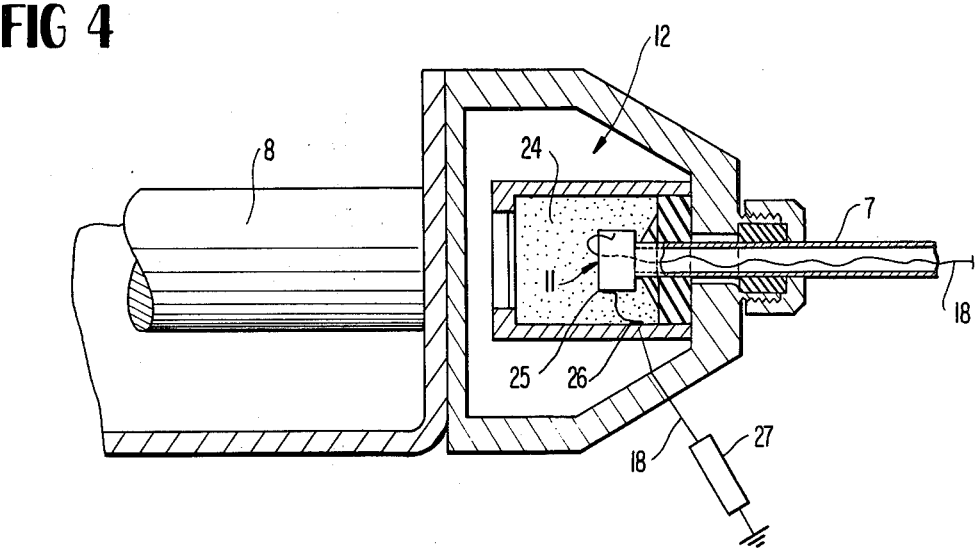
FIG. 4 is a somewhat schematic cross-sectional view illustrating the details of the parts within the dash and dot circle "Y" of FIG. 1.

According to FIG. 3, the igniter or primer 22 is constructed as so-called fuse pellet and is secured in the housing 13 by a stuffing-box-like threaded plug 23 which simultaneously holds fast the fuse cord 7. The electrical line 18 embedded in the fuse cord 7, which extends by way of the branch and coupling members 6 (FIG. 1) up to the energy sources 12, is extended into the interior of the housing 13 and, according to FIG. 2, is connected to the amplifier 16. If the igniter or primer 22 is electrically ignited, then the fuse cord, connected with the igniter or primer, is also ignited and burns off with high velocity up to its respective free end 11 which—as indicated particularly clearly in FIG. 4—is connected to an energy source 12. The energy source may be constructed as pyrotechnical charge 24 of conventional type, whereby the gases produced during the burning thereof, drive a pyromotor (not shown) of any known construction in the sense of an elimination of the belt looseness. The electrical line 18 carried along with the fuse cord 7 extends into an end cap 25 against which abuts an electrical contact 26. The line 18 leads from the contact 26 under interconnection of a resistance 27 to ground. As a result of the last-described arrangement, a circuit is closed whereby in case of an intact line, a predetermined value is reached which is detected by the amplifier 16 and is then suitably evaluated. If this value deviates from the predetermined magnitude, then this indicates a defective wiring or open line 18 which is indicated by the lighting up of the optical indication 5 (FIGS. 1 and 2).

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by th scope of the appended claims.

We claim:

1. A triggering system for a motor vehicle passenger protection means activated by an energy source means, the triggering system comprising a sensor-controlled means including an igniter means, said sensor-controlled means supplying a triggering pulse to the igniter means in the presence of predetermined criteria, wherein the improvement comprises means for accommodating the igniter means so as to shield the igniter means from external influences, a transmission path means between the igniter means and the energy source means, the transmission path means including at least one high burning velocity fuse cord means arranged between the igniter means and the energy source means, and means for continuously testing the operating readiness of the transmission path means including an electrical line carried along with the fuse cord means.

2. A triggering system according to claim 1, wherein the igniter means includes a pyrotechnical primer.

3. A triggering system according to claim 1, wherein the accommodating means includes a housing surrounding the sensor-controlled means.

4. A triggering system according to claim 1, wherein the energy source means includes a pyrotechnical charge.

5. A triggering system according to claim 1, wherein the sensor-controlled means includes at least one sensor element, at least one means for storing an amount of energy necessary for activating the igniter means, and means for operatively connecting the at least one sensor element to the igniter means and the energy storing means so that, upon a failure of the energy source means and upon a generation of the triggering pulse, the energy storing means supplies the stored energy to activate the igniter means.

6. A triggering system according to claim 5, wherein two energy storing means are connected in series, each of the energy storing means is constructed as a means for providing an electric power source.

7. A triggering system according to claim 6, wherein said two energy storing means form a primary cell.

8. A triggering system according to claim 6, wherein said two energy storing means are capacitors with a relatively high value.

9. A triggering system according to claim 6, wherein said two energy storing means are constructed as accumulator batteries.

10. A triggering system according to claim 5, wherein the energy source means includes a plurality of pyrotechnical charges, and in that the fuse cord means is formed into a line network having free ends connected to the pyrotechnical charges of the energy source means.

11. A triggering system according to claim 10, wherein branch and coupling means adapted to be plugged into one another are provided for forming the fuse cord means into the line network.

12. A triggering system according to claim 1, wherein the fuse cord means is formed into a line network having at least one free end connected to the energy source means.

13. A triggering system according to claim 12, wherein branch and coupling means adapted to be plugged into one another are provided for forming the fuse cord means into the line network.

14. A triggering system according to claim 1, wherein the continuous testing means further includes an optical indicating means.

15. A triggering system for a vehicle passenger protection means activated by an energy source means, the triggering system comprising a sensor-controlled means including an igniter means, said sensor-controlled means supplying a triggering pulse to the igniter means in the presence of predetermined criteria, the improvement comprising means for accommodating the igniter means so as to shield the igniter means from external influences, a transmission path means between the igniter means and the energy source means, the transmission path means includes at least one high burning velocity fuse cord means arranged between the igniter means and the energy source means, the sensor-controlled means includes at least one sensor element, at least one means for storing an amount of energy necessary for activating the igniter means, means for operatively connecting the at least one sensor element to the igniter means and the energy storing means so that, upon a generation of the triggering pulse, the energy storing means supplies the stored energy to activate the igniter means, the energy source means includes at least one pyrotechnical charge, the fuse cord means is formed into a line network having at least one free end connected to the pyrotechnical charge of the energy source means, and means for continuously testing the operating readiness of the transmission path means including an electrical line carried along with the fuse cord means.

16. A triggering system according to claim 15, wherein the continuous testing means further includes an optical indicating means.

17. A triggering system according to claim 16, wherein the accommodating means includes a housing surrounding the sensor-controlled means.

18. A triggering system according to claim 17, wherein the igniter means includes a pyrotechnical primer.

* * * * *